United States Patent [19]

Griffith et al.

[11] 4,081,995

[45] Apr. 4, 1978

[54] APPARATUS AND METHOD FOR EXTRAPOLATING THE ANGULAR POSITION OF A ROTATING BODY

[75] Inventors: Glen R. Griffith, Westminster; Zane A. Sandusky, Orange; George A. Watson, Tustin, all of Calif.

[73] Assignee: Rockwell International Corporation, El Segundo, Calif.

[21] Appl. No.: 771,056

[22] Filed: Feb. 22, 1977

[51] Int. Cl.² .............................................. F02P 5/08
[52] U.S. Cl. .................................... 73/116; 73/117.3; 123/117 D
[58] Field of Search .............................. 73/116, 117.3; 123/117 D; 324/16 T; 235/150.21; 340/271

[56] References Cited

U.S. PATENT DOCUMENTS

| | | | |
|---|---|---|---|
| 3,923,022 | 12/1975 | Scholl | 123/117 D |
| 3,927,648 | 12/1975 | Kawai et al. | 123/117 D |
| 4,009,378 | 2/1977 | Sakamoto | 235/150.21 |

Primary Examiner—Anthony V. Ciarlante

Attorney, Agent, or Firm—H. Fredrick Hamann; G. Donald Weber, Jr.; Leonard Tachner

[57] ABSTRACT

An apparatus and method for predicting the time occurrence of the desired angular position of a rotating body, such as the crankshaft of an internal combustion engine. The apparatus includes means for storing a nonlinearly changing count that is set to a known starting value when the rotating body is at a known angular position. A computing means is included for computing the value of the count that corresponds to the time when the rotating body will be at the desired angular position. The computation is achieved by extrapolating from known count information based upon prior periods of angular displacement of the rotating body during periods of known duration. In addition, the apparatus includes means for reducing the error associated with extrapolating the desired angular position of a rotating body undergoing either acceleration or deceleration by basing the extrapolation on a known period of angular displacement that occurred earlier than the most recent period of rotation immediately prior to the extrapolation process.

8 Claims, 10 Drawing Figures

APPARATUS AND METHOD FOR EXTRAPOLATING THE ANGULAR POSITION OF A ROTATING BODY

BACKGROUND OF THE INVENTION

1. Field of the Invention

This invention is directed to an internal combustion engine electronic ignition spark advance system and, more particularly, to a position extrapolator for use in such a spark advance system which affords cost and performance advantages over prior art devices.

2. Description of the Prior Art

It is common knowledge in the internal combustion engine art that the timing of the firing of the spark plugs in an internal combustion engine should be changed as a function of engine speed and other engine parameters to obtain optimum performance from the engine. Generally, it is preferable to advance the timing as a function of engine RPM with spark plug firing occurring near top dead center of the piston stroke cycle at low engine RPM and at progressively earlier points in the piston stroke cycle as engine RPM increases.

Historically, regulation of the point in the cycle where spark occurs (spark advance) has been accomplished automatically by mechanical means dependent upon engine speed, or related to engine air pressure or vacuum, and engine rotation. Such spark advance techniques are commonly referred to as vacuum advance and centrifugal advance. Mechanical techniques for advancing the spark timing of an internal combustion engine as a function of engine speed are described in the text *Internal Combustion Engines Analysis and Practice* by Edward F. Obert, Second Edition 1950, (Chapter 14, *Spark Ignition Engines*).

In recent years, the conventional spark ignition system, including the conventional coil, breaker point and rotary distributor, has been replaced to an increasing degree by more advanced and sophisticated electronic ignition systems. Improved engine performance may be derived from such advanced electronic ignition systems by, for example increasing the electrical voltage applied to the spark plugs and also controlling a pulse width in accordance with the engine parameters. However, the engine performance is inhibited by mechanical spark advance techniques which are not commensurate with the improved performance provided by such sophisticated electronic ignition systems. Accordingly, in recent years a concerted effort has been made in the applicable technology to develop a spark advance timing system which, on the one hand, provides a substantial increase in accuracy and performance commensurate with the sophistication of the electronic ignition systems, but which, on the other hand, is of relatively low cost, a factor of particular importance in the automotive industry.

With the advent of microprocessor computers, the actual calculation of the appropriate point in the stroke cycle or the corresponding crank shaft angular position at which each spark plug should be fired, has become sufficiently accurate and relatively inexpensive to be commensurate with previously-mentioned electronic ignition systems. However, one significant problem area still remains, namely, that of providing a relatively low cost means for accurately determining when the crank shaft angular position corresponds to the desired position for spark ignition.

Usually, position detectors rely upon one or more sensors that produce a reference signal in the form of a pulse at a predetermined angular position of the crank shaft or of the distributor shaft of the engine. Thus, at least once during each rotation of the engine crank shaft or distributor shaft a signal is produced which accurately indicates the actual angular position of the shaft at that time. Furthermore, since the period of these pulses is inversely proportional to the rotational rate of the engine, this pulse period is often also used to provide a calculating device with an indication of engine RPM. Engine RPM is one of the engine parameters commonly used in calculating desired spark advance.

One prior art technique employed to determine the angular position of the crank shaft between reference pulses, is to provide a so called "toothed wheel", also rotated by the crank shaft or distributor shaft, to generate additional reference pulses at a substantially higher frequency corresponding for example to each 0.5° of angular rotation. One such toothed wheel system is disclosed in U.S. Pat. No. 3,923,022, issued Dec. 2, 1975. The general concept of such a toothed wheel approach is described below in conjunction with prior art FIG. 1.

The resolution of the position determining device that employs a toothed wheel approach is proportional to the angular distance the individual teeth are spaced from one another, for example 0.5°. The accuracy of the toothed wheel approach is usually not affected to any significant extent by engine acceleration or deceleration. However, the use of an additional sensor and multiple generating device, adds substantial additional cost to the overall ignition timing system. Thus, alternate techniques for determining angular position without incurring the cost associated with the toothed wheel approach are preferable, particularly if accuracy, especially during acceleration when engine performance is critical, can be kept commensurate with the sophistication of electronic ignition systems. Such alternate techniques fall generally into the category of devices called position extrapolators which in effect predict the crank shaft angular position, extrapolating information that is dependent on the periodicity of the comparatively low frequency sensing device.

One such extrapolation device in the prior art, and discussed below in conjunction with prior art FIG. 2 employs extrapolation based upon a linear counting device that is reset by a reference pulse. Although such devices avoid the substantial cost penalties associated with the toothed wheel approach, they suffer from other disadvantages which, as will be seen below, are substantially alleviated by means of the present invention. One disadvantage associated with prior art position extrapolation devices is their inherent inaccuracy in an accelerating or decelerating engine, and another disadvantage relates to their special hardware requirements for a relatively broad range of engine speeds.

Accordingly, the present invention provides a position extrapolation device for an electronic ignition, spark timing system, that obviates the inherent cost penalties of prior art toothed wheel devices but which provides substantial improvement over prior art position extrapolation devices.

By way of example, high speed adders are needed to accomplish the frequency multiplication techniques utilized in the prior art. However, in order to attain the high speed performance associated with such prior art devices, it is usually necessary to use wider surface area gates because such wider areas gates permit the achievement of higher speeds by presenting lower resistance paths to current. Of course wider gates mean larger and more expensive chips even in metal oxide semiconductor large scale integration MOS/LSI. The requirement for high speed devices often dictates the use of parallel logic flow with an associated increase in number of elements required to handle paralled signals. This increase in the number of elements also contributes to an increase in chip size and cost. Furthermore, the linear counting techniques of prior art devices call for a relatively large number of bits to meet resolution requirements over a wide range of engine rates.

SUMMARY OF THE INVENTION

The disadvantages of the prior art are obviated by the present invention which, by means of a unique non-linear countdown process, satisfies the resolution requirements of a wide range of engine rates with fewer bits of information, thus, further reducing the circuit speed requirement and hardware and cost penalties associated with prior art position extrapolating devices. The inaccuracy of prior art position extrapolating devices in engines undergoing acceleration or deceleration is substantially reduced in the present invention. This improvement results from a unique position count computing process in which, for engine rates higher than a nominal rate data representing more than only the most recent rate is taken into account.

The present invention is an apparatus and method for predicting the time of occurrence of a desired angular position of a rotating body such as the crank shaft of an internal combustion engine, by employing means for generating a non-linearily changing count signal. The count is set to a known starting value when the rotating body is at a known angular position. Computing means are also employed for computing the value of the count that corresponds to the time when the rotating body will be at the desired angular position by extrapolating on the basis of prior periods of rotation of known duration. The invention herein described also provides means for reducing the error associated with extrapolating the desired angular position of a rotating body undergoing either acceleration or deceleration, by basing the extrapolation on a known period of rotation that occurred earlier than the most recent prior to the extrapolation process.

BRIEF DESCRIPTION OF THE DRAWINGS

FIG. 5 is a logic diagram of an exponential down-counter and a previous-period holding register of the invention.

FIG. 6 is a representation of a digital operation performed in the exponential down-counter of the invention.

DESCRIPTION OF A PREFERRED EMBODIMENT

Figure 1:
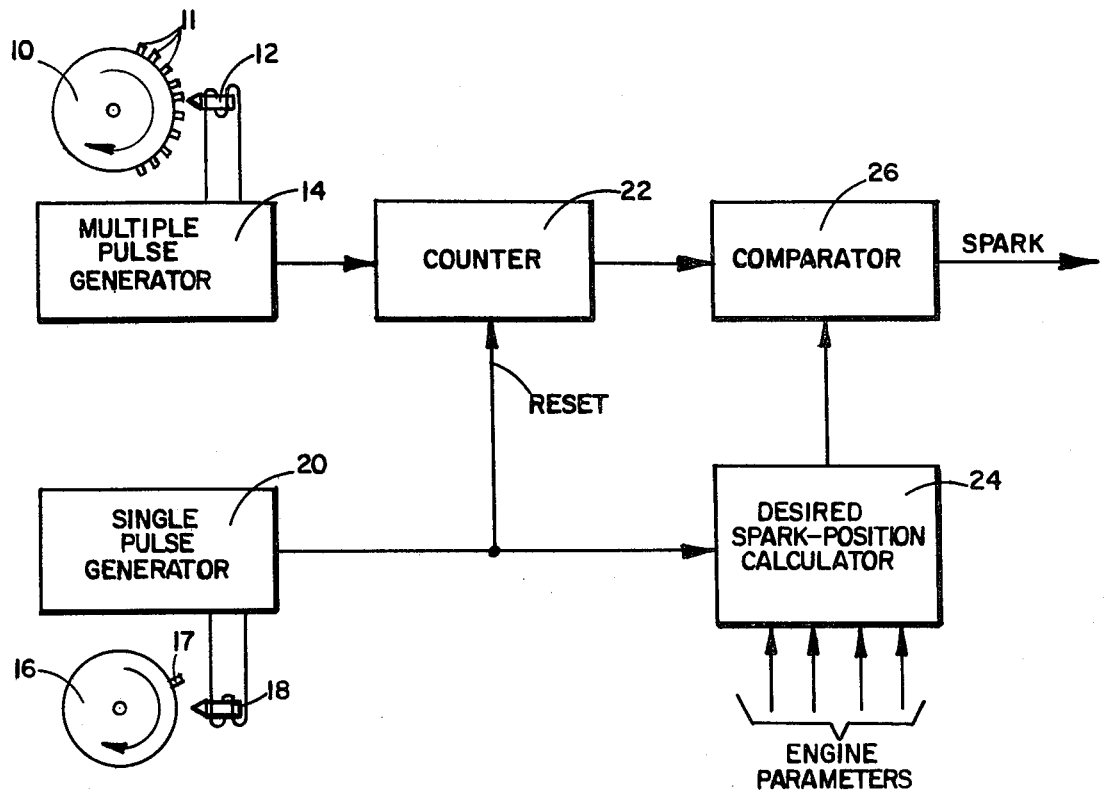
FIG. 1 is a general block diagram of a toothed wheel approach of the prior art.

Referring now to FIG. 1, there is shown, in block diagram form, a so-called "toothed wheel" apparatus for determining the position of the crank shaft of an internal combustion engine. As indicated in FIG. 1, this prior art approach utilizes two crank shaft wheels. The first crank shaft wheel 10 includes a plurality of electrical signal introducing devices 11 (teeth) each of which generates an electrical signal when rotated past a sensor 12. The output pulses of sensor 12 are applied to a multiple pulse generator 14 which generates corresponding pulses. Each of the pulses produced by generator 14 has an amplitude and width more suitable for use in the remaining portions of the circuit. The pulses produced by multiple generator 14 are applied to and counted by counter 22.

A second crank shaft mounted wheel 16 includes signal inducer 17 which is mounted at a known position of the wheel. Each time signal inducer 17 passes sensor 18 it induces a signal which is supplied to single pulse generator 20. Single pulse generator 20 generates a corresponding pulse having electrical parameters more suitable for use in the remaining portions of the circuit. One use for the output signal of single pulse generator 20 is the resetting of counter 22, while a second is providing an input signal which is representative of the engine's rate of rotation to desired spark-position calculator 24. However RPM data may also be derived from multiple pulse generator 14. As shown in FIG. 1, additional signals representing various other engine parameters are usually applied to calculator 24 which incorporates engine RPM as well as such other engine parameters in the calculation of the desired spark position.

Typically, as a crank shaft rotates and signal inducer 17 passes sensor 18, the output signal of a single pulse generator 20 resets counter 22 to zero or some other known starting count. Simultaneously, as multiple tooth wheel 10 rotates, the multiple pulse generator 14 generates a continuing train of pulses the frequency of which is dependent upon the engine rate. As soon as counter 22 is reset by pulse generator 20, counter 22 begins to count at a rate porportional to the number of pulses generated by multiple pulse generator 14 and, thus also proportional to the engine rate of rotation. Counter 22 produces an output signal which represents the continually changing count. This counter output signal is applied to a comparator 26 which also receives a desired-count signal from calculator 24. The desired-count signal represents the count corresponding to the crank shaft angular position at which it is desired to generate a spark in one of the spark plugs associated with the engine. Accordingly, when the desired-count signal and the counter signal, both of which are compared in comparator 26, become equal to each other, comparator 26 produces an output signal called SPARK that is used to fire a spark in the selected spark plug.

Thus, it is seen that the prior art techniques for determining the angular position of the crank shaft of an internal combustion engine is easily accomplished by the toothed wheel device illustrated in FIG. 1 whereby a spark is produced at an angular position, with accuracy which is dependent only upon calculator 24 and the distance between the teeth 11 of wheel 10.

As previously indicated, the prior art concept illustrated in FIG. 1 is prohibitively expensive in the context of the automobile industry because of the requirement for adding an additional crank shaft wheel or other similar device having a large plurality of sensing "teeth" for generating relatively high frequency pulses that are used to ascertain the angular position of the crank shaft.

As previously indicated, position extrapolation devices can predict the crank shaft angular position on the basis of only one pulse generated by crank shaft wheel 16. Accordingly, such devices obviate the high cost associated with the second crank shaft wheel having multiple teeth. One such position extrapolation technique of the prior art is represented in block diagram form in FIG. 2 wherein a crank shaft wheel 30 includes a reference signal generating device 32, a sensor 34 and a single pulse generator 36. In combination, these elements serve the purposes previously indicated for the corresponding elements of FIG. 1. However, the multiple teeth of crank shaft wheel 10 of the FIG. 1 approach are obviated in the position extrapolation technique of FIG. 2 by a clock source 40 and a count frequency multiplier 38 which multiply the pulse repetition frequency of single pulse generator 36 by some constant that is dependent upon the frequency of clock source 40. Thus, for example, if the count frequency multiplier multiplies pulse repetition frequency of single pulse generator 36 by a factor of 100, the output of count frequency multiplier 38 is counted by counter 41 as approximately 100 pulses for each revolution of crank shaft wheel 30, instead of the single pulse produced by single pulse generator 36.

Figure 2:
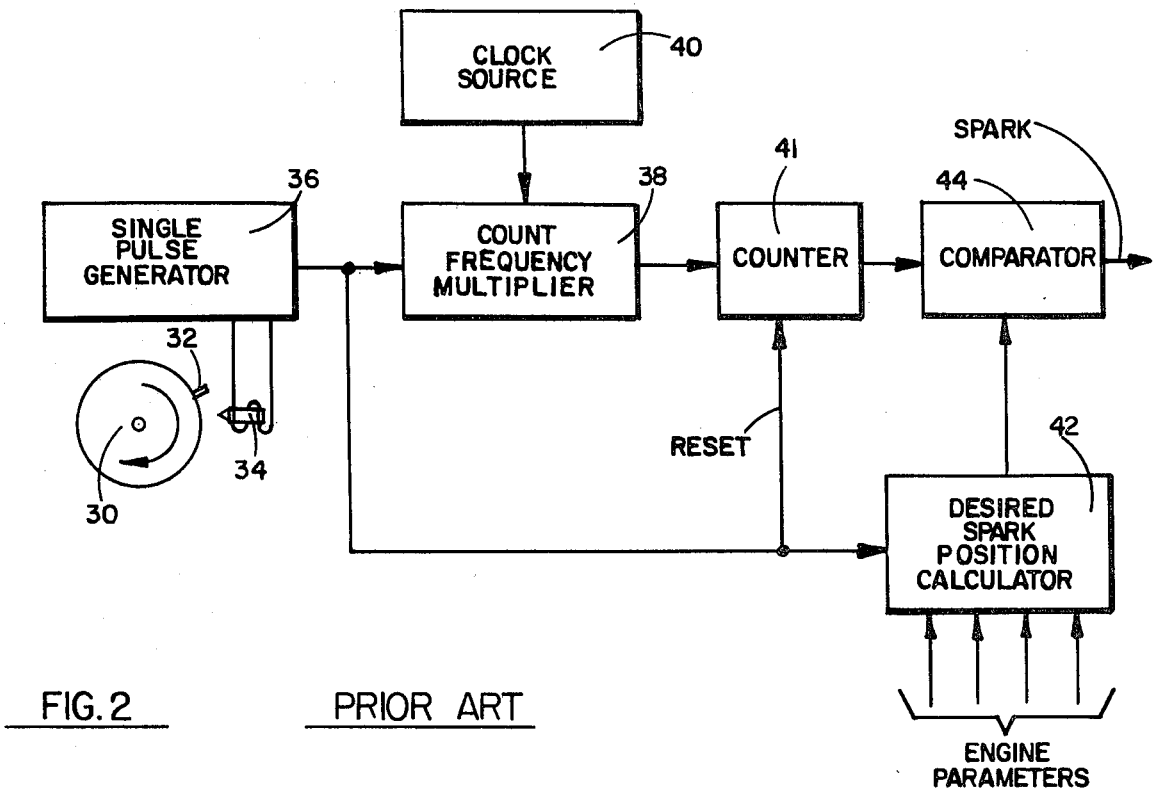
FIG. 2 is a general block diagram of a position extraolation device of the prior art.

As indicated in FIG. 2, the output of single pulse generator 36 is applied to the desired spark-position calculator 42, which also receives other signals representing additional engine parameters. Desired spark-position calculator 42 utilizes the input signal information to generate a signal corresponding to the desired spark position count. The desired count signal and the output signal of counter 41 are applied to comparator 44 which produces an output signal SPARK when the two input signals are equal.

For constant engine speed the accuracy of position extrapolation device of FIG. 2, may be equal to or even superior to the accuracy of the toothed wheel approach of FIG. 1. However, since the output of count frequency multiplier 38 in FIG. 2 is based on an estimate of the periods between reference pulses generated by a single pulse generator 36, (usually based on the most recent completed period of rotation of crank shaft wheel 30), substantial inaccuracy results during engine acceleration and deceleration. On the other hand, the toothed wheel approach of FIG. 1 inherently remains as accurate during acceleration and deceleration as it is during constant engine speed because the output of the counter utilized in such toothed wheel approach is not dependent on any type of estimation process based upon a previous period of rotation.

The inherent problems of inaccuracy of the prior art extrapolation systems are even more readily evident from a detailed description of one such prior art position extrapolation apparatus provided in U.S. Pat. No. 3,767,902 issued Oct. 23, 1973.

The present invention is also a position extrapolation apparatus which therefore also obviates the requirements for a second crank shaft wheel having a large number of additional signal devices. However, unlike the prior art extrapolation devices represented by FIG. 2, the position extrapolator of this invention utilizes apparatus for producing a prediction of crank shaft angle based in part on an extrapolation of an earlier reference pulse period. This apparatus substantially reduces the errors normally associated with position extrapolation in an engine undergoing acceleration and deceleration. Furthermore, the present invention utilizes a unique non-linear count-down device in lieu of a linear count frequency multiplier or other such linear counting device and thereby achieves additional advantage over the prior art by substantially reducing the hardware requirements for position extrapolation over a wide range of engine rates.

It is to be noted that the present invention also includes the capability for varying the "dwell" time of the ignition system with which the invention is used. The term dwell time is commonly associated with spark ignition systems that employ an ignition coil and refers to the time in which primary current in the ignition coil is allowed to increase subsequent to a prior firing of a spark plug. In ignition sytems that employ conventional points, the dwell time may be related to the fraction of the rotational period during which the points remain closed.

Figure 3:
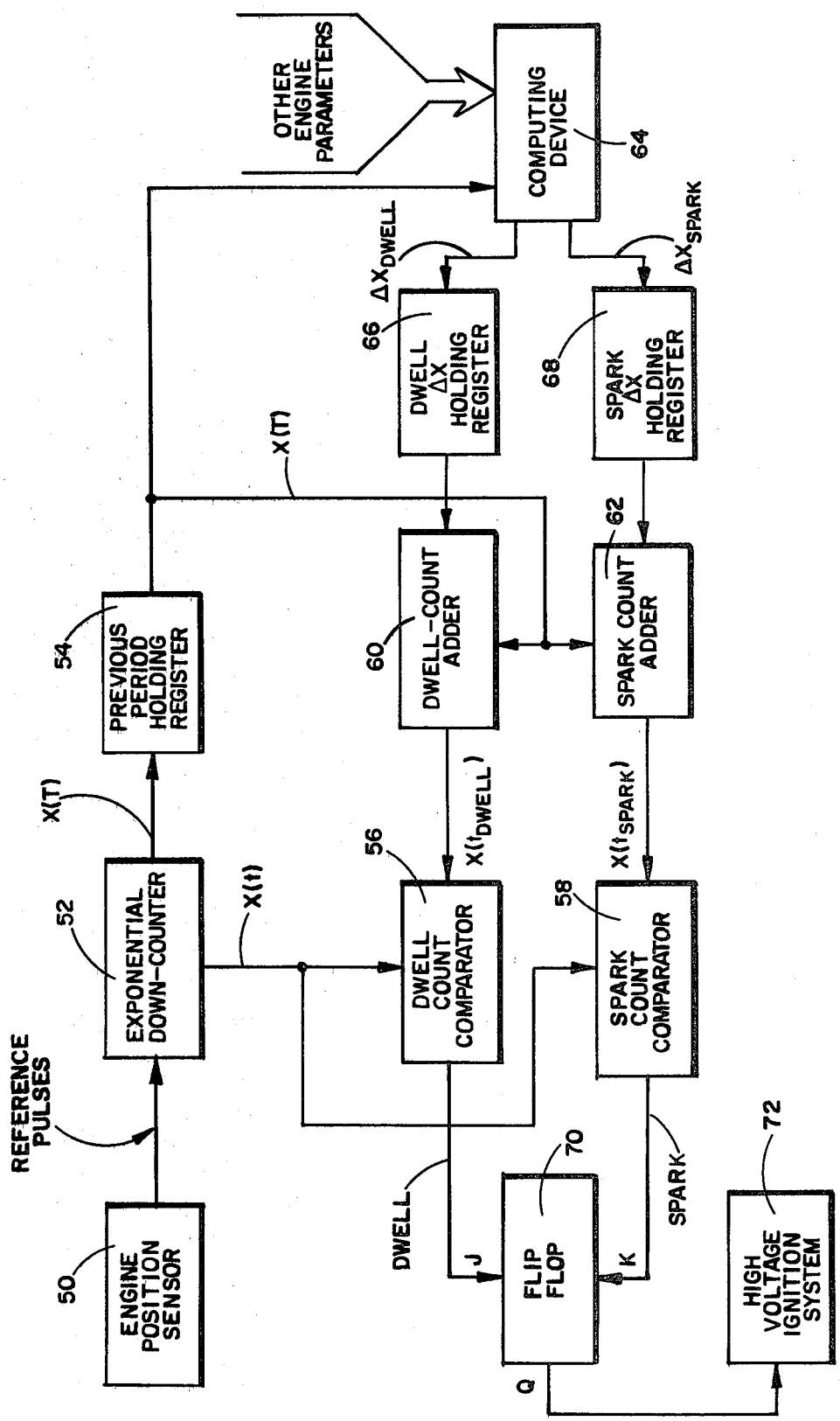
FIG. 3 is a detailed block diagram of the present invention.

Referring now to FIG. 3, it will be observed that the invention provides an engine position sensor 50 that generates reference pulses. This engine position sensor may be equivalent to a crank shaft wheel sensor pulse generator arrangement of the prior art. A relatively low frequency sensor signal is produced by a rotation of the crank shaft and this signal is shaped to produce a reference pulse.

Figure 4:
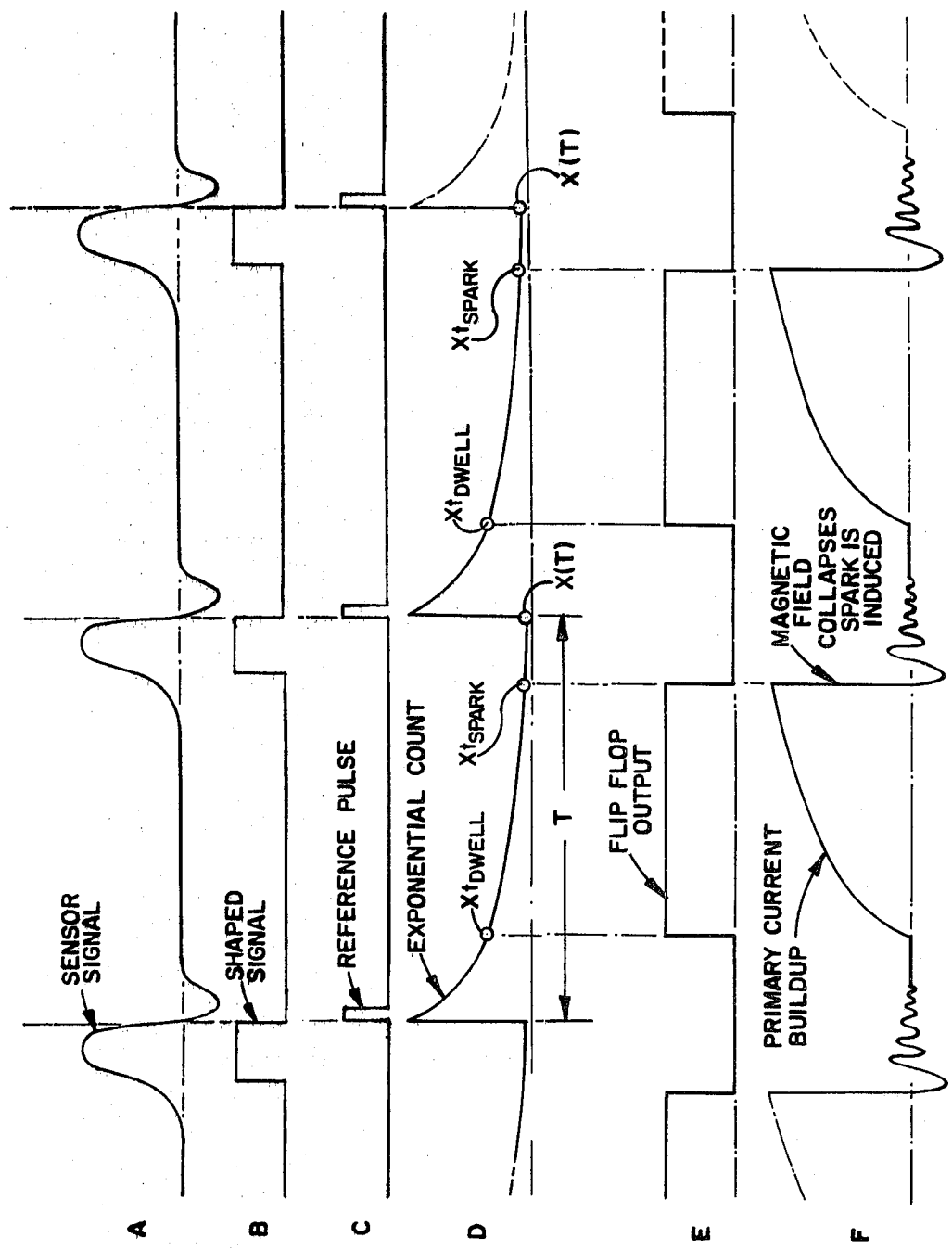
FIG. 4 is a timing diagram indicating many of the timing relationships of signals employed in this invention.

Waveforms A, B and C of FIG. 4 illustrate the general nature of the signals that are employed in the engine position sensor 50 of FIG. 3. Waveform A illustrates the general behavior of a sensor signal that might be generated in response to rotation of the crank shaft or distributor shaft, and an induced electromagnetic force resulting from the relative motion between the shaft and the sensor.

Typically the sensor signal A is pulse-like and has a relatively long rise time, long fall time, overshoot and other undesirable characteristics for signals commonly employed in digital circuits. Accordingly, engine position sensor 50 employs circuits for shaping the sensor signal to produce the shaped signal represented by waveform B. The falling edge of the shaped signal B is detected to produce the reference pulse represented by waveform C of FIG. 4. As indicated in FIG. 3, the reference pulse, waveform C of FIG. 4, generated by engine position sensor 50 is applied to exponential down-counter 52. As shown in FIG. 4, each reference pulse of waveform C causes the exponential count waveform D produced by exponential down-counter 52, to be reset to an initial starting value. Then the count signal again decreases in accordance with a substantially exponential function until it is again reset by a subsequent reference pulse at the end of period T, that is, the period between reference pulses. For purposes of discussion herein, the instantaneous value of the exponential function produced by exponential down-counter 52 is denoted by the symbol $X(t)$. On the other hand, the final value of the count produced by the exponential count wave form, that is, the final value of the output of exponential down-counter 52, is denoted by the symbol X(T). The final value of the count corresponds to the lowest count reached by the exponential counter before it is reset by the next reference pulse at the end of the period T.

As shown in FIG. 3, the final count X(T) is applied to a previous period holding register 54. Previous period holding register 54 retains the final count X(T) of the most recently completed period T while down-counter 52 is in the process of producing a new counter signal during the incompleted current period T. Accordingly, the contents of previous period holding register 54 correspond to one period prior to the current period of exponential down-counter 52.

As shown in FIG. 3, the output signal X(t) of the exponential down-counter 52 is applied to dwell count comparator 56 and spark count comparator 58. Accordingly, comparators 56 and 58 receive an input signal that represents the diminishing current count of down-counter 52. Each comparator also receives a fixed count signal that represents the calculated desired count that corresponds to the extrapolated crank shaft angular position at which the appropriate ignition event should take place. These desired counts $X(t_{DWELL})$ and $X(t_{SPARK})$, produced respectively by dwell count adder 60 and spark count adder 62, are applied respectively to the dwell count comparator 56 and the spark count comparator 58.

The output signal of previous period holding register 54, that is the previous period count X(T), is applied to dwell count adder 60 and to spark count adder 62. The previous period count X(T) is also applied to a computing device 64 where it is used as a parameter in calculating the desired spark and dwell times and their corresponding counts. Other engine parameters are also applied to computing device 64 for use therein in calculating the desired crank shaft angular positions.

Computer device 64 generates two output signals that are used in conjunction with the invention for the purpose of developing the desired counts $X(t_{DWELL})$ and $X(t_{SPARK})$. Computing device-generated signals $\Delta X_{DWELL}$ and $\Delta X_{SPARK}$ are applied respectively to dwell $\Delta X$ holding register 66 and to a spark $\Delta X$ holding register 68. These $\Delta X$ signals are applied respectively to adders 60 and 62 to which a second input signal is the previous period count X(T).

Comparators 56 and 58 produce their respective output signals DWELL and SPARK only when an equality occurs between the two input signals applied to the respective comparators. The two signals DWELL and SPARK are applied respectively to the set and reset terminals J and K of JK flip flop 70. The output signal of flip flop 70, available at output terminal Q, is then applied to high voltage ignition system 72. Waveform E of FIG. 4 illustrates the flip flop output corresponding to the two desired count signals $X(t_{DWELL})$ and $X(t_{SPARK})$ of waveform D of FIG. 4. Waveform F of FIG. 4 indicates the primary current waveform corresponding to the output signal of flip flop 70. Current in the primary winding of the coil of high voltage ignition system 72 begins to increase at the point in the period T when the exponential count signal induced by exponential down-counter 52 equals the desired dwell count $X(t_{DWELL})$. Current continues until the magnetic field collapses and a spark is induced in the appropriate spark plug at a time in the period T when the exponential count signal is equal to the desired spark count $X(t_{SPARK})$.

The exponential down-counter 52 is reset to its starting value each time a reference pulse is generated. Between reference pulses the output of down-counter 52 may be represented by the equation:

$$X(t) = Ke^{-t/\tau} \quad (1)$$

where $t$ is the time since the last reference pulse and $K$ is a constant determined by the parameters of the circuit used for generating the exponential function, and $\tau$ is a constant representing a number of time units.

As previously indicated, at the occurrence of each reference pulse, the previous-period holding register 54 is loaded with the final count of exponential down-counter 52 before it is reset by the subsequent reference pulse. Therefore the holding register 54 contains a count $$X(T) = Ke^{-T/\tau} \quad (2)$$

where $T$ is the period between the two reference pulses.

Computing device 64 computes a desired crank shaft angle, $\theta$, based upon engine RPM and other engine parameters X(T) and $\theta$ are then used to calculate a count $X(t_d)$ of exponential down-counter 52 that is predicted to correspond to the time of the desired crank shaft angle. This desired count $X(t_d)$ may be calculated as follows:

$$X(t) = Ke^{-t/\tau} \quad (3)$$

therefore $t = -\tau \ln [X(t)/K] \quad (3)$

The desired time of crank shaft angular position is:

$$t_d = \frac{\theta_d}{\theta_p} T$$

where $\theta_d$ is the calculated desired angle after the reference position; $\theta_p$ is the angle between reference pulses, (typically 90°); and T is the period between reference pulses also
$$T = -\tau \ln \frac{X(T)}{K} \quad (4)$$

therefore:
$$t_d = -\frac{\theta_d}{\theta_p} \tau \ln \frac{X(T)}{K} \quad (5)$$

and
$$X(t_d) = Ke\left|\frac{\theta_d}{\theta_p} \ln \frac{X(T)}{K}\right| = K\left|\frac{X(T)}{K}\right|\left|\frac{\theta_d}{\theta_p}\right| \quad (6)$$

It will be seen below in conjunction with FIG. 7, that the computing device 64 also computes a difference count value $\Delta X$ which is defined as follows:

$$\Delta X = X(t_d) - X(T). \quad (7)$$

One difference count value $\Delta X_{SPARK}$, which is based on a desired count $X(t_{SPARK})$ for spark signal generation, is produced. Another difference count value $\Delta X_{DWELL}$, which is based on a desired count $X(t_{DWELL})$ for dwell time signal generation, is also produced.

Figures 5, 6:
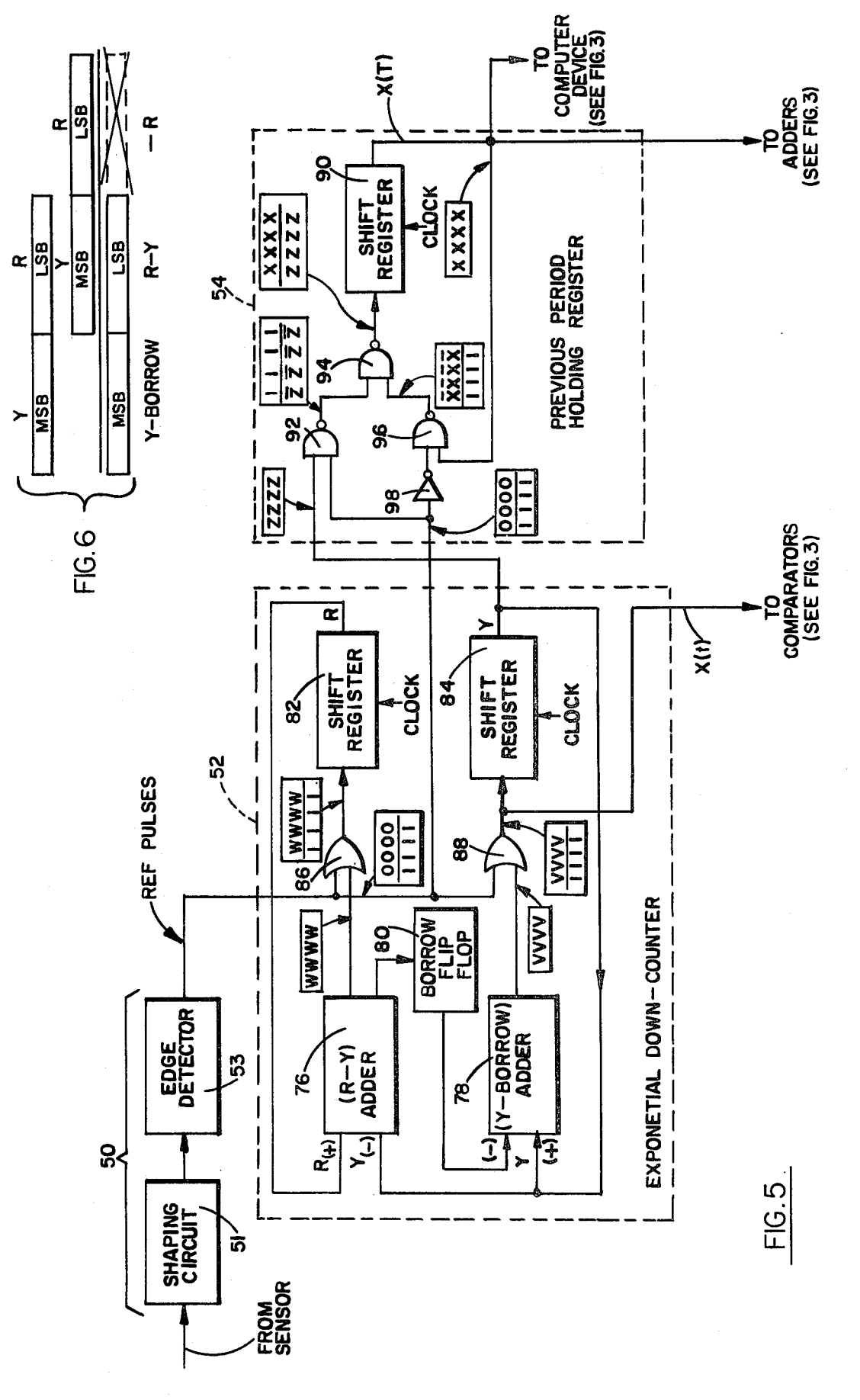

Referring now to FIGS. 5 and 6, the operation of exponential down-counter 52 and of previous holding register 54 are described in detail.

As shown in FIG. 5, the exponential down-counter 52 receives reference pulses from shaping circuit 51 and edge detector 53 which are included in engine position sensor 50 of FIG. 3. The reference pulses are applied respectively to two-input OR gates 86 and 88 within exponential down-counter 52. The second input signal to each such OR gate is the output signal of an adder 76 and 78, respectively. Adder 76 performs the function of subtracting a quantity Y from a quantity R. Adder 78 performs a similar function namely that of subtracting a quantity BORROW from a quantity Y wherein BORROW is the output of a borrow flip flop 80. The output signals of OR gates 86 and 88 are applied respectively to shift registers 82 and 84, which produce output signals designated R and Y, respectively.

The operations performed by exponential down-counter 52 to generate an output signal which behaves in accordance with an exponentially decreasing function, are now described.

It is well known that an exponentially decreasing function which may be defined generally by the following equation:

$$X(t) = K_1 e^{-t/\tau}$$

has a derivative with respect to the variable $t$ which is defined by the equation $$\frac{dx}{dt} = \frac{-K_1 e^{\frac{-t}{\tau}}}{\tau} = \frac{-1}{\tau} X(t)$$

Accordingly, when $t$ represents time for small increments $\Delta t$ of elapsed time, the original value of the function $X(t_1)$ at time $t_1$, decreases to a new value $$X(t_2) = X(t_1) - \frac{\Delta t}{\tau} X(t_1).$$

Thus, for small increments $\Delta t$, the previously defined exponentially decreasing function may be closely approximated by repeatedly subtracting a constant multiple of the previous value of $X(t)$. The embodiment of exponential down-counter 52 of FIG. 5 employs a differential subtraction operation to closely approximate an exponentially decreasing function by digital means.

FIG. 6 represents the differential subtraction operations taking place within exponential down-counter 52 to closely approximate a decreasing exponential function where the quantities Y and R represent the most significant bits MSB's and least significant bits LSB's respectively, of a digital representation of the minuend of the subtraction process. Similarily, division by $\tau$ time units to produce the differential subtrahend to be subtracted from the minuend is obtained by shifting the MSBs and LSBs, represented by Y and R, to the right by the number of bits corresponding to the MSBs, that is the number of bits contained within the operand Y. Then, in the subtraction process, the minuend Y and R and the subtrahend corresponding to a right shifted Y and R, produce the remainder represented by the MSBs and LSBs under the summation line of FIG. 6 as the R − Y (LSBs) and the Y − Borrow (MSBs). The −R portion of the remainder to the right of the LSBs, R − Y, may be ignored because of its trivial effect on the subtraction process.

As shown in FIG. 5, shift register 82 contains the LSBs R of the minuend of FIG. 6, and shift register 84 contains the MSBs Y of the minuend of FIG. 6. It will now be clear that the adders 76 and 78 of FIG. 5 perform the subtraction process that generates the exponentially decreasing function in that adder 76 produces the LSBs, R − Y, of the remainder and adder 78 produces the MSBs, Y − Borrow, of the remainder.

In the embodiment of the invention herein disclosed, the exponential down-counter 52 and the previous period hold register 54 employ serial logic elements. Accordingly, the shift registers are serial devices in which the contents are progressively shifted register-element-to-register-element at the occurance of each pulse of a clock signal, CLOCK, generated by a clock generator (not shown). In the perferred embodiment the clock signal generator has a frequency of 277 kilohertz and, thus, the bit shift period is 3.6 microseconds. In such an embodiment of the invention, the shift registers 82, 84 and 90 each employ 10 bit elements. Accordingly, a 10 bit shift, such as that which occurs when the MSBs Y are subtracted from the LSBs R, corresponds to division by the constant $\tau = 1,024$ time units. In a preferred embodiment of the invention each such time unit is 36 microseconds. However for purposes of convenience in illustrating the manner in which exponential down-counter 52 and previous period holding register 54 operate, the logic flow is described with only four bit positions shown in each serial word.

As indicated in FIG. 5, the output of adder 76 may, for example, comprise the four bits represented by WWWW. Similarly, the output of adder 78 may be represented by the four bits VVVV. Reference pulses generated at the output of edge detector 53 are of sufficient duration to appear as a full word of either all ZEROS, (0000) or all ONES, (1111) during the application of bits WWWW and bits VVVV to their respective OR gates 86 and 88. Accordingly, the corresponding output signals of OR gates 86 and 88 will be either the same four bits applied to output terminals of adders 76 and 78 or all ONES depending upon whether the reference pulse logic levels are ZEROS or ONES as shown in FIG. 5. Therefore, when a reference pulse occurs, and all ONES are applied to the reference pulse input terminal of OR gates 86 and 88, shift registers 82 and 84 are each filled with all ONES which represent the starting value, K, of the signal generated by exponential down-counter 52. Thereafter, between reference pulses, when the reference pulse input signal applied to OR gate 86 and 88 is all ZEROS, shift registers 82 and 84 continue to receive the output signals of adders 76 and 78, respectively. As shown in FIG. 5, the output signals of the shift registers, namely the LSBs R and the MSBs Y of the minuend of the differential substraction operation, are fed back as input signals to the plus (+) terminals of the corresponding adders 76 and 78. In addition, the MSBs Y are also applied to the minus terminal (−) of adder 76 for the subtraction operation R − Y as indicated in FIG. 5. A "Borrow" output signal of adder 76 is applied to borrow flip flop 80. When the R − Y subtraction accomplished by adder 76 results in a borrow output signal, that borrow output signal is applied to the minus terminal (−) of adder 78. In this way, the subtraction operation involving the LSBs R − Y of the remainder, may be carried into the MSBs, Y − borrow, of the remainder when it is appropriate to do so.

Accordingly, it may be seen that the exponential down-counter 52 is a serial logic feedback/adder circuit which performs a discrete differential subtraction process that produces an output that closely follows the function $X(t) = Ke^{-t/\tau}$.

It will now be recalled that the function of the previous period holding register 54 is to respond to the reference pulse by storing the current value of exponential down-counter 52 at that time and to retain that value until the next subsequent reference pulse.

Previous period holding register 54 also employs a shift register 90 as well as NAND gates 92, 94 and 96 and inverter 98.

As shown in FIG. 5, reference pulses are applied to NAND gate 92 and also to inverter 98. The output signals of inverter 98 are applied to one input terminal of two-input NAND gate 96. The second signal applied to an input terminal of NAND gate 92 is the output signal of shift register 84 of exponential down-counter 52 and the second input signal to two-input NAND gate 96 is the output signal of shift register 90 of the previous period holding register 54. The output signals of NAND gates 92 and 96 are applied to respective input terminals of two-input NAND gate 94, the output terminal of which is connected to the input terminal of shift register 90.

The operation of previous period holding register 54 may be understood best by referring to the four-bit representations of the signals applied to the shift register 90 and the various logic elements of the holding register. As previously indicated, it is assumed for purposes of discussion that the output signal of shift register 84 of exponential down-counter 52 comprises four bits ZZZZ and that the output signal of shift register 90 comprises the four bits XXXX.

As shown by the logic indications in FIG. 5, when the reference pulse is applied to inverter 98 and NAND gate 92, that is, when the data bits in those respective devices correspond to a word having all ONES, the output signal of NAND gate 92 contains the four bits that are the complements of the four input bits, namely $\overline{ZZZZ}$. Likewise, the output signal of NAND gate 96 comprises all ONES. Accordingly, the output signal of NAND gate 94 comprises the complement of the bits applied to the output terminal of NAND gate 92 and, thus, the four bits ZZZZ are available at the input terminal of shift register 90 to be clocked into the shift register by the clock signal CLOCK. Accordingly, at the time of occurrence of the reference pulse, the output signal of shift register 84 of exponential down-counter 52 is applied to shift register 90 of the previous period holding register 54.

Between reference pulses, when the effective bit content at the input terminal of inverter 98 and the input terminal of NAND gate 92 comprises all ZEROS, the output signal of NAND gate 92 comprises all ONES and the output signal of NAND gate 96 comprises the complements $\overline{XXXX}$ of the input bits XXXX. Accordingly, the output signal of NAND gate 94 is the complement XXXX of the output signal of NAND gate 96. Accordingly, between reference pulses, the input to the shift register 90 is merely a feedback output signal of the same shift register. Thus, the shift register 90 of the previous period holding register 54 recirculates its contents between reference pulses, thereby, maintaining the previously stored value which corresponds to the final count of down-counter 52 at the occurrence of the previous reference pulse.

Figure 7:
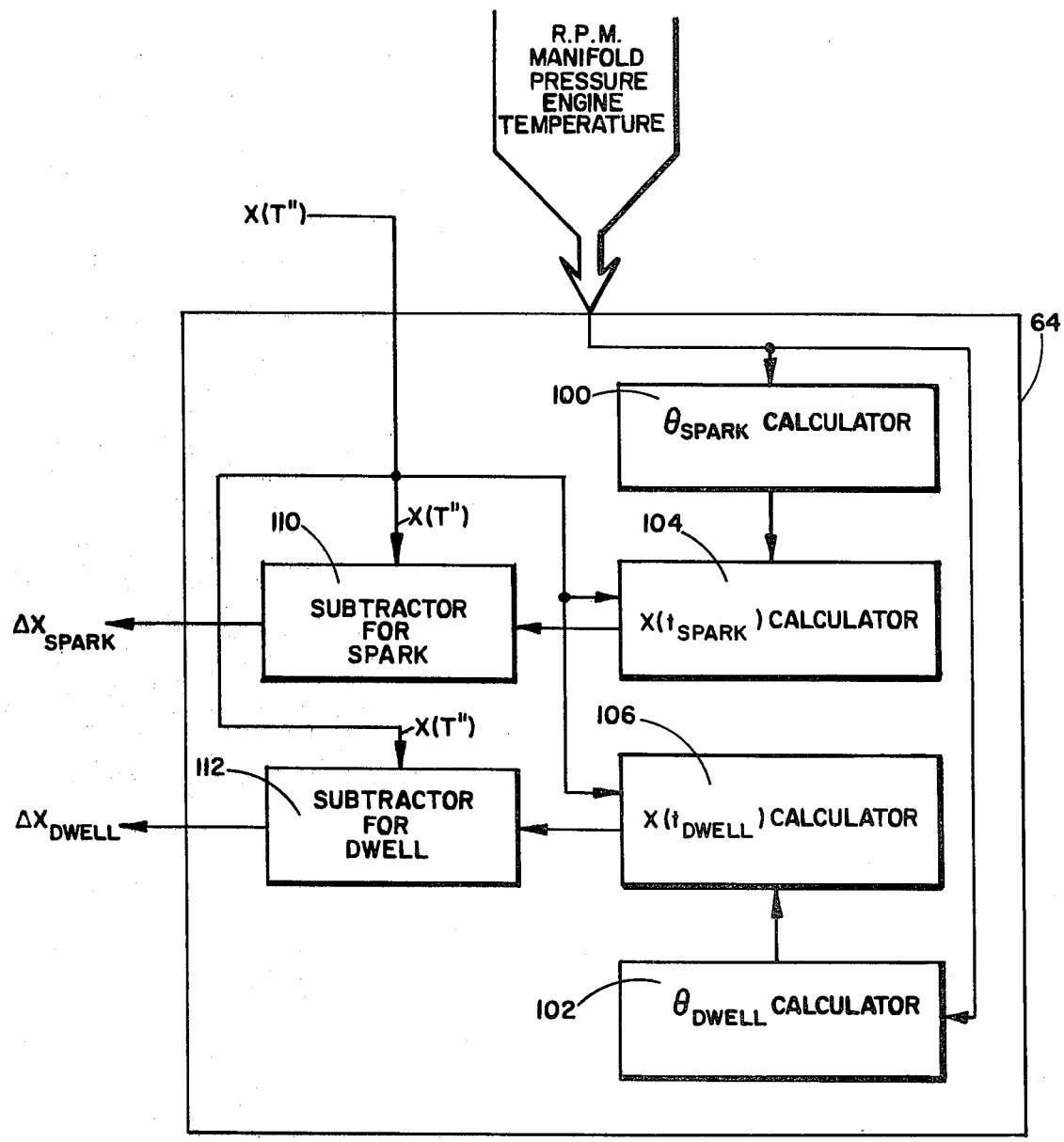
FIG. 7 is a functional block diagram of a portion of the calculating device employed in the invention.

FIG. 7 is a functional block diagram of that portion of the computing device 64 that provides the two output signals $\Delta X_{SPARK}$ and $\Delta X_{DWELL}$ previously discussed in conjunction with FIG. 3. As shown in FIG. 7, computing device 64 receives a plurality of engine parameter signals including signals that represent the engine rate, the manifold pressure of the engine, and the engine temperature. These parameters are used in the calculation of the desired crank shaft angles, denoted by $\theta_{SPARK}$ and $\theta_{DWELL}$, at which the corresponding spark and dwell times are to be calculated. The calculating processes performed by calculator 64 are represented in function diagram form by FIG. 7. Accordingly, calculator 64 includes $\theta_{SPARK}$ calculator 100 which represents the function of calculating the desired crank shaft angular position for producing a spark in the selected spark plug from the above enumerated engine parameter signals. Similarly included is $\theta_{DWELL}$ calculator 102 which performs a similar calculation for the corresponding crank shaft angle position for dwell time.

Each calculator produces a signal representing the angular position and the output signals of calculators 100 and 102 are then converted to signals that represent corresponding exponential counts that are used to develop the signals applied to comparators 56 and 58 of FIG. 3. The output signals of calculators 100 and 102 are applied to count calculators 104 and 106, respectively, which produce count signals corresponding to the extrapolated counts of exponential down-counter 52 at which the engine crank shaft is extrapolated to be at the desired angular position for spark generation and dwell time, respectively. Since the corresponding count calculation is based upon a previous period T, calculators 104 and 106 receive an output signal from previous period holding register 54 which is used to temporarily store a previous final period count X(T). This signal, also applied to subtractor 110, is used for the calculation of $\Delta X_{SPARK}$ and is applied to subtractor 112 where it is used for the calculation of $\Delta X_{DWELL}$.

The output signals $\Delta X_{SPARK}$ and $\Delta X_{DWELL}$ produced by computing device 64 and applied, as shown in FIG. 3, to holding registers 66 and 68, respectively, represent the differences between the calculated counts that correspond to predicted crank shaft angular positions and the final count X(T) of the previous period T between reference pulses generated by engine position sensor 50 in FIG. 3. The descriptions of FIGS. 3 and 7 indicate that this invention subtracts previous final period count X(T) from the calculated position count in calculator 64 and then adds back such a final count in adder 60 and 62 after a delay introduced by registers 66 and 68 as shown in FIG. 3. It will be understood that this subtraction of a previous final period count X(T) from the calculated position count in calculator 64 and the subsequent addition of final count in adders 60 and 62 after a delay introduced by register 66 and 68, provides significant reduction in the acceleration and deceleration error which is not available in prior art position extrapolation devices.

Figure 8:
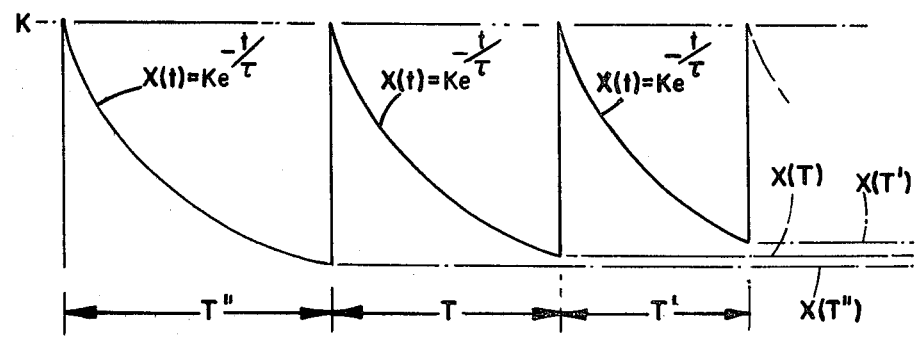
FIG. 8 is a graph that is used to describe the means for achieving improved accuracy during engine acceleration and deceleration.

The explanation of the error reduction resulting from the subtraction and subsequent addition is provided in conjunction with FIG. 8 which represents a waveform generated by exponential down-counter 52 over three periods during which the engine is experiencing acceleration. As indicated in FIG. 8, the general behavior of the output signal of exponential down-counter 52 remains the same, namely approximating the function $X(t) = Ke^{-t/\tau}$. The only difference between the waveforms generated during progressive periods of rotation is the time of occurrence of the reference pulse and thus the time of the occurrence of the resetting of the exponential down-counter 52 to the original starting value K. As illustrated in FIG. 8, the period for the longest elapsed time between reference pulses, or in other words, the lowest rate of engine rotation is designated T''. The next two periods during acceleration are designated T and T' respectively. As also illustrated in FIG. 8, since the output signal of exponential down-counter 52 has less time in which to decay during increasing engine rates of an accelerating engine, the final count of each such period, designated X(T''), X(T), and X(T') respectively, is progressively greater during acceleration.

It will be assumed for purposes of this description that the engine crank shaft is presently rotating in the cycle of FIG. 8 corresponding to T'. Therefore, previous period holding register 54 will retain a final count corresponding to the previous period T, namely final count X(T). However, the holding registers 66 and 68 will at this point in time each be generating a signal calculated on the basis of the final count X(T''), namely the final count reached during the earlier period T''. Thus is FIG. 7, it will be observed that the signal that is applied to subtractors 110 and 112 respectively, is denoted by the symbol X(T'') and not by the symbol that denotes the present contents of the previous period holding register 54, namely X(T).

Accordingly, the final period count that is subtracted from the calculated position count within the computing device 64 is usually not the same final period count that is subsequently added back to the difference signal ΔX in either of adders 60 or 62. Instead, the final value subtracted in computing device 64 at engine rates above a nominal rate, corresponds to a period earlier than the period of the final value added back in adders 60 and 62.

It will be seen below that this feature of the present invention provides a distinct advantage over the prior art position extrapolation devices, namely, a substantial reduction in the extrapolation error during acceleration and deceleration of the engine. It will be understood that extrapolation errors occur during acceleration and deceleration because the period T between reference pulses no longer represents a correct indication of engine rate at the time of the next succeeding period during which the extrapolation calculation is performed. Assume, for example, that in FIG. 8 T'' = 1,100 time units, T = 1,000 time units, T' = 900 time units and that $\theta_d/\theta_p = 0.5$. Then using above equations 2 and 6 with K = $2^{10}$ = 1,024, and $\tau$ = 1,024 time units, the final period counts are:

X(T'') = 345,
X(T) = 386, and
X(T') = 425, and the correct desired counts for $\theta_d/\theta_p$ = 0.5 are:
X($t_d''$) = 598,
X($t_d$) = 628, and
X($t_d'$) = 660.

If conventional extrapolation methods are used to compute X($t'_{SPARK}$), that is, the apparent count for $\theta_d/\theta_p$ = 0.5 based on the most recently completed period X(T), then X($t'_{SPARK}$) = 628.

The angular positions for the correct count of 660 and for the apparent count of 628 during period T', (assuming reference pulses are generated every 90° of rotation), are 45° and 50° respectively where $$\theta_d = \theta_p \cdot \frac{\ln X(t') - \ln K}{\ln X(T') - \ln K}.$$

Thus conventional extrapolation methods result in an error $E_1$ = 11.1%.
Where:

$E_1 = (50° - 45°)/45° = 11.1\%$

On the other hand, if the extrapolation method of the present invention is used to compute X($t'_{SPARK}$), that is, the apparent count for $\theta_d/\theta_p = 0.5$ based on the earlier period X(T''), then X($t'_{SPARK}$) = 635.

The angular position for the apparent count of 635 during period T', (again assuming reference pulses are generated every 90° of rotation), is 48.9° using the above equation for $\theta_d$.

Thus the extrapolation method of this invention results in an error $E_2$ = 8.67% where:

$E_2 = (48.9° - 45°)/45.0° = 8.67\%$
and the resultant error reduction is ΔE = 28% where ΔE = ($E_1 - E_2$)/$E_1$

Thus, for the above example of an accelerating engine, the present invention achieves a 28% reduction in extrapolation error over prior art position extrapolators.

The reason for the error reduction should now be evident from the prior example and the supporting equations. Putting it briefly, during acceleration, for a constant value of $\theta_d/\theta_p$, the correct desired count increases but in smaller increments than corresponding increases in the final period counts. Therefore, the difference ΔX between the desired count and the final count, decreases during acceleration. Thus, an "older" ΔX, being greater than a more recent ΔX, partially compensates for the erroneously smaller final count of the most recent period. Clearly, an even "older" ΔX may provide an even greater reduction in error under certain conditions and the present invention encompasses such use of an "older" ΔX. It will now be understood that the reduction in error is also achieved during deceleration.

In a preferred embodiment of the invention, the operations represented by the functional block diagram of FIG. 6 are performed by a programmable microprocessor computer comprising P-channel metal oxide semiconductor large scale integrated circuits. This microprocessor is a 10-bit, serial, stored program computer that utilizes table lookup processes both for calculating the desired spark angle advance and also for converting from a desired crank shaft angle $\theta_d$ to a corresponding count difference ΔX.

The microprocessor uses a ten-bit word length for instruction, data and processing. A ten bit program counter is used to address up to 1024 words stored in a read-only memory device which can be allocated for storing program parameters, fixed data and program instructions. The microprocessor's operation is synchronized by 3.6 microsecond period logic clock. Of course, the invention is not limited to these parameters of elements. The computer may use any suitable word length and can use N-channel circuits, or the like.

Figure 9:
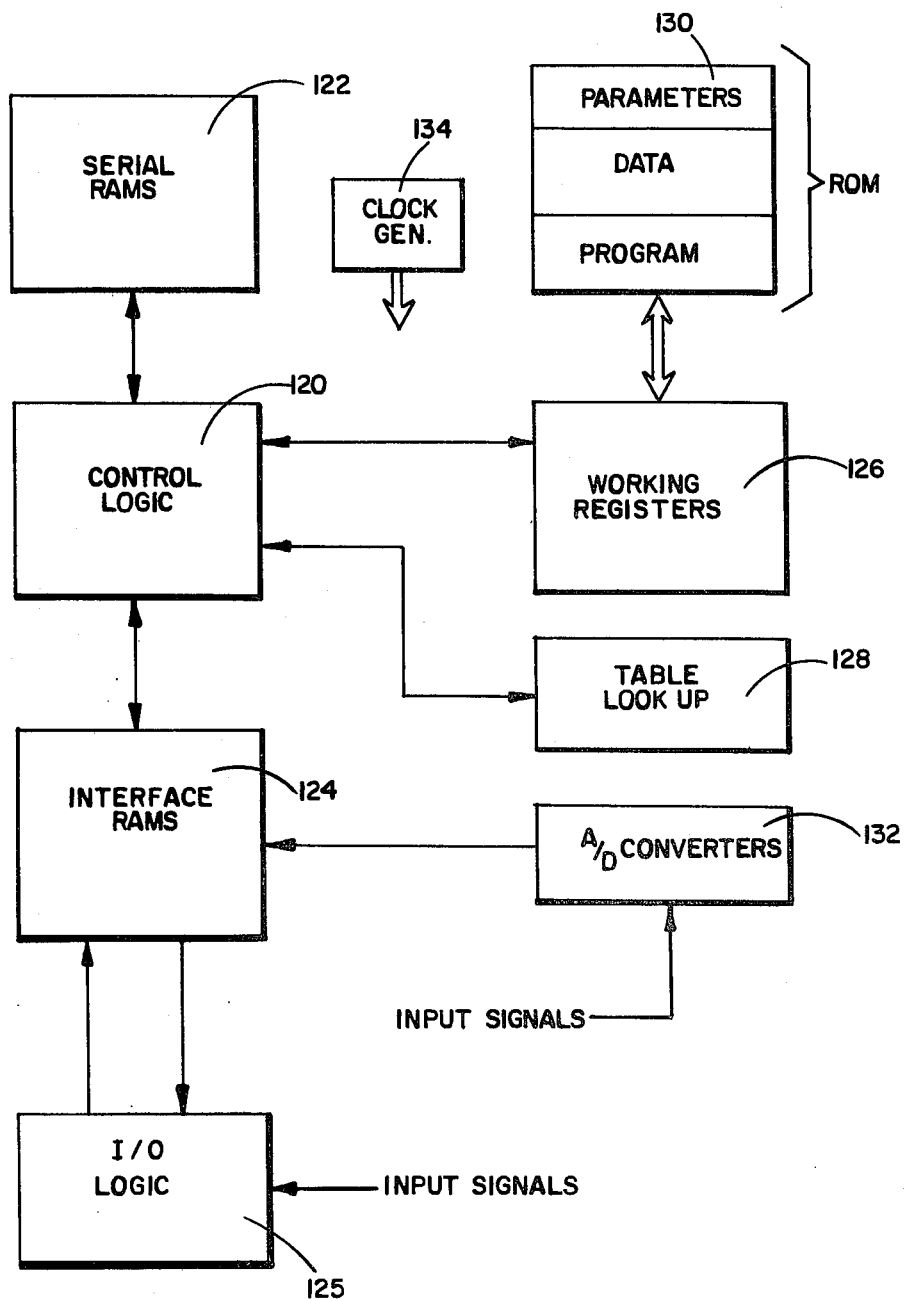
FIG. 9 is a general block diagram of a microprocessor that may be used in conjunction with the invention.

Referring now to FIG. 9, there is shown a block diagram of the microprocessor employed in a preferred embodiment of the invention. The microprocessor comprises a control logic interface random access memories 124, working register file 126 and table lookup logic 128. The working register file 126 is, in turn, connected for bidirectional signal flow to the read-only memory 130. Input/output logic 125 receives digital signals to be used in the calculation process. In addition, analog-to-digital converters 132 receive input signals in analog form and convert them to digital form so that they can be applied to interface random access memories 124 for use within the microprocessor. Clock generator 134, is used as a stable time base to synchronize the operations of the microprocessor.

Read-only memory 130 is, typically, a ten-bit parallel fixed memory circuit which may be accessed each clock time. Registers within the working registers 126 store 10-bit addresses for conveniently accessing up to 1024 words stored in the memory unit.

Read-only memory circuit 130 contains three kinds of information, namely program signals, data signals and parameter signals. Program signals are the contents of the read-only memory 130 that are addressed by a program counter register within the working register file 126 and provide the program instruction being executed by the microprocessor. Another register within working register file 126 addresses data stored in the form of tables in read-only memory 130. Address registers within control logic circuit 120 are used to address parameter signals which provide program addresses and mathematical constants that are not part of tables stored in the data signal storage portion of the read-only memory 130.

In addition to the program counter register and other working registers that are used in conjunction with read-only memory 130, working register file 126 also contains an accumulator register which has the capability of shifting bits serially either left or right to perform simple mathematical operations on data signals retrieved from the read-only memory 130 and stored in the working registers.

Table look-up logic 128 includes a scale register and a multiplier that are used for special multiply routines to interpolate between data points stored in the read-only memory in the form of data look-up tables.

Serial random access memories 122 are alterable and consist of 18 ten-bit serial recirculating registers with provision for parallel addressing and serial loading and reading. Interface, random access memories 124 store the converted digital input data for use within the microprocessor. The control logic circuit 120 provides appropriate addresses to the interface random access memories 124 so that the stored input data are directed to the appropriate working register, serial RAMs and other circuits within the microprocessor.

Control logic circuit 120 includes an instruction register for storing instruction signals read from read-only memory 130 to control the sequence of microprocessor operations. Control logic circuit 120 also includes an address register that is used for accessing data signals stored in serial interface random access memories 122 and interface random access memories 124. In addition, the control logic circuit 120 comprises an adder which processes and gates information into the accumulator register within working register file 126. The adder, which is a serial full-adder/subtractor with carry/borrow capability, accepts input signals from the working registers, the read only memory unit and also from the random access memory devices in serial random access memories 122 and in interface random access memories 124, to provide an output signal to the accumulator register. Control logic circuit 120 also contains a single flag storage register which is used to enable or inhibit conditional instructions in accordance with the truth state of the signal stored as a flag. The multiply, clear, subtract and add instructions involving the accumulator register within working register file 126, use the flag register in the control logic circuit 120 as an indication of overflows or underflows resulting from mathematical operations performed within the microprocessor.

Clock generator 134 is a crystal oscillator controlled device that produces a typical frequency of 277.9 KHz, corresponding to a clock period of 3.6 microseconds. The word time or instruction execution time, which consists of ten logic clock times, has a typical frequency of 27.79 KHz and a corresponding period of 36 microseconds. Accordingly, each instruction, in the embodiment described herein, is executed in 36 microseconds.

The difference count signals $\Delta X$ are available at terminals of the interface random access memories 124 for transfer to the holding registers of FIG. 3.

Figure 10:
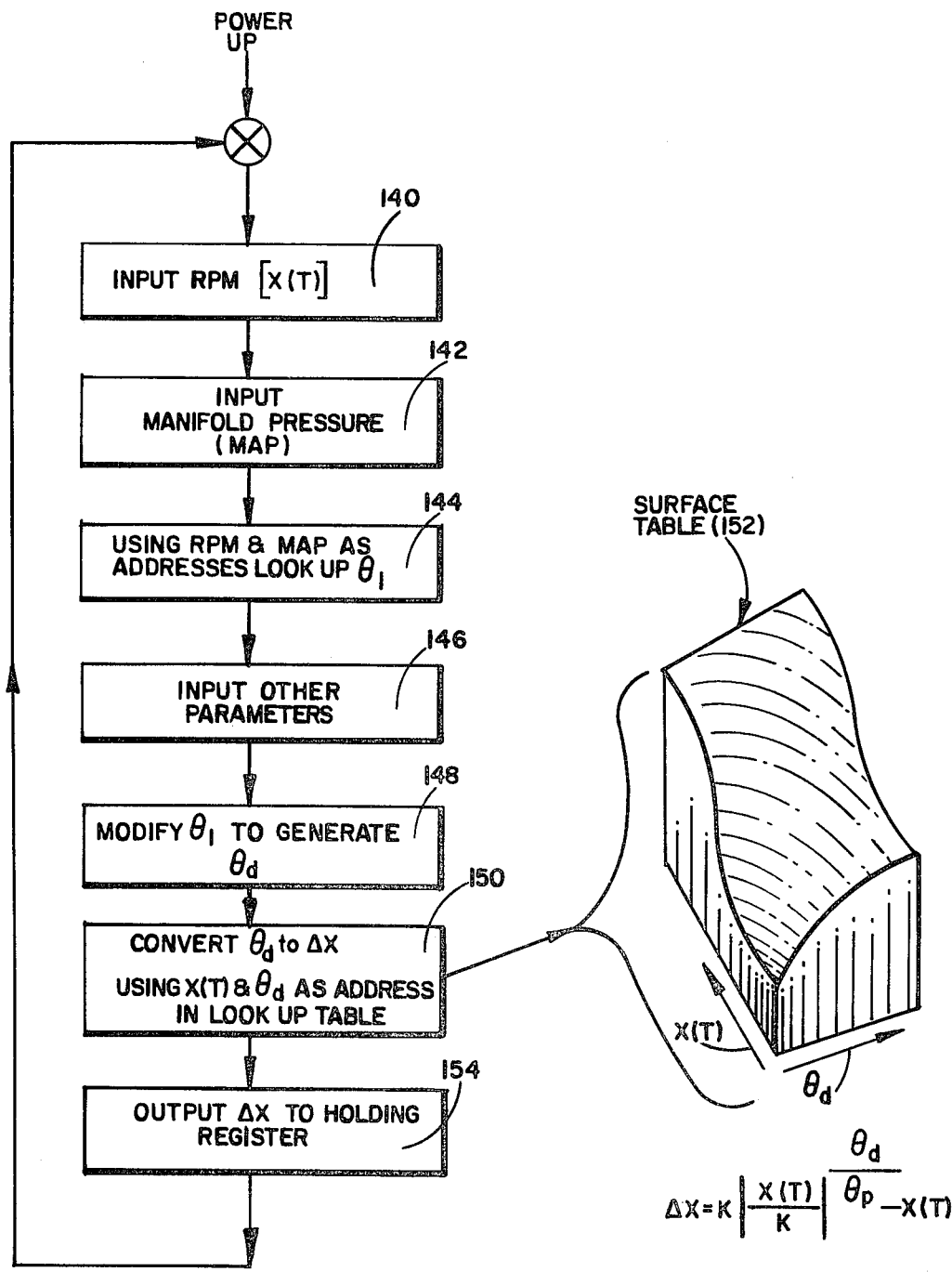
FIG. 10 is a flow chart and surface table representation of the computations performed by the microprocessor of FIG. 9.

FIG. 10 is a general flow chart of the operations performed by the microprocessor of FIG. 9. The microprocessor converts input signals that represent engine parameters and in input signal that represents the final count stored by previous period holding register 54, (see FIG. 3), to the appropriate output signals $\Delta X$, as previously discussed in conjunction with FIG. 7. Accordingly, as shown in FIG. 10, the first operation performed in a microprocessor sequence, is to "input" the signal X(T) which represents the most current data regarding the rate of rotation of the crank shaft. This operation is represented by block 140 in FIG. 10.

The subsequent operation, block 142, is an "input" of engine manifold absolute pressure (MAP) which is another engine parameter used in the calculation of the desired advance angle $\theta_d$. The next operation, block 144, is a table lookup in which the microprocessor utilizes addresses corresponding to RPM and engine manifold absolute pressure to find the corresponding angle $\theta_1$ in a data table stored in read-only memory 130 of FIG. 9.

In the next operation, the microprocessor "inputs" other engine parameter data to be used in the calculation of desired angle $\theta_d$. The microprocessor then modifies the previously obtained angle $\theta_1$ in accordance with the most recently "input" parameter data to generate the angle data representing advance angle $\theta_d$.

It will be understood that the process and the means for computing the desired advance angle $\theta_d$ from one or more engine parameters is old in the art and does not constitute a novel element of the current invention. Of the operations indicated in flow diagram form in FIG. 10, only operation 150 constitutes an element of the present invention, per se. In operation 150, the microprocessor converts the angle information $\theta_d$ to a signal that represents the difference count $\Delta X$. In doing so the microprocessor utilizes the input signal X(T) and the previously computed $\theta_d$ as addresses that are applied to read-only memory 130. As shown in the representation of a surface table 152 to the right of the flow diagram in FIG. 10, the addresses formed by the respective signals X(T) and $\theta_d$ may be looked upon as axis locations whereby particular addresses define a single point on the surface of surface table 152 which corresponds to the desired result, ΔX, of operation 150.

From equations 6 and 7 discussed previously, it will be readily apparent that the surface table 152 is defined in relation to its addresses X(T) and $\theta_d$ in accordance with the equation for ΔX shown below surface table 152 in FIG. 10.

As indicated by operation 154 of FIG. 10, after the table lookup operation 150 produces the desired output signal ΔX, that signal is applied to the holding registers 66 or 68 of FIG. 3, depending on whether ΔX relates to the spark advance angle or to the dwell angle.

In the embodiment of the invention in which the microprocessor of FIG. 9 is employed, the total time for completing operations 140 to 154 of FIG. 10, is approximately 13 milliseconds. Accordingly, every 13 milliseconds the appropriate holding register of FIG. 3 is loaded with a new ΔX signal representing the latest computation. Since the preferred embodiment of the invention employs reference sensors spaced at 90° intervals along the rotating member of the engine, 13 milliseconds corresponds to an engine rate of 1154 RPM. Thus, engine rates higher than 1154 RPM cause the previous period holding register 54 of FIG. 3 to be loaded more frequently than holding register 66 or 68 of FIG. 3. Accordingly, it is at these higher engine rates (1154 RPM and up), that the computation time results in an earlier final count X(T) being used for the calculation than the final period count X(T) being used for the addition performed within adders 60 and 62 of FIG. 3. It is, therefore, at engine rates of 1154 and higher that the aforementioned error reduction during acceleration comes into play. Of course, it will be apparent that the system will operate satisfactorily below this engine rate because rates lower than 1154 RPM are not substantially above the idle rates of typical automobile engines. Furthermore, the rate at which error reduction is first achieved is a function of computation time and other variables and is not intended as a limitative feature of the invention, but merely as an example in a preferred embodiment. It will now be understood that error reduction increases commensurately with the ratio of computation time to the period between reference pulses.

SUMMARY

It will now be apparent to those of ordinary skill in the art to which the present invention pertains that what has been described herein is an apparatus and a method for predicting the position of a rotating member, such as a crank shaft or the distributor shaft of an internal combustion engine, for the purpose of initiating an action such as the generation of a spark in the selected spark plug. Furthermore, it will now be apparent that the invention, being a position extrapolation device, avoids the harsh cost penalties of prior art toothed wheel approaches. In addition, the invention also provides substantial improvement over prior art position extrapolation devices by means of a unique nonlinear decreasing count operation. The invention also provides substantial improvement in the accuracy of such prior art devices during acceleration and deceleration of the engine, by means of a unique subtraction and addition process that produces a substantially self-compensating and, thus, more accurate prediction of angular position.

For purposes of simplifying the explanation, language has been used which may sound like it is concerned with mental processes, but which in fact is concerned with physical processes. For example, the terms "instruction", "information", and "word", particularly where reference is made to storage and transfer thereof, refer specifically to instruction signals, information signals and word signals or other manifestations of instructions, information and words which are capable of physical manipulation. The term "transfer data", "transfer information" and similar instructions refer to the manipulation of those signals or manifestations.

It is to be understood that while the invention has been described with particular reference to signals in serial binary form, signals in other logic form, such as parallel binary form or trinary form, may be considered within the scope of this invention. Furthermore it is to be understood that while binary signals described herein in conjunction with this invention are considered to be in a ONE or TRUE state when in a constant voltage level, such as +5 volts d.c. and are considered to be in a ZERO or FALSE state when a constant voltage level such as 0 volts d.c. the scope of this invention also includes binary signals the states of which depend upon the direction of change from one voltage level to another.

Many details of the type which would be obvious to one skilled in the art have been omitted. For example, many precautions that would obviously be taken in order to assure accuracy and reliability of the computation processes, such as the manner of generating and applying clock signals, have not been mentioned. Similarly, arrangements for causing operations to occur at predetermined times in predetermined sequences or at specified intervals have not been described. Furthermore, not all of the details of the logic circuits of this invention have been described. However, any omitted details would now be known to those of ordinary skill in this art and the drawings and description provided herein would make it obvious to those of such skill how to make and use the invention. All of these other details are of such nature that they could be supplied by a person having ordinary skill in the art to which the present invention pertains.

The invention described herein may be employed in many ways different from those specifically set forth. For example, the apparatus and processes described herein for predicting the position of a rotating member may be employed in numerous systems other than in an internal combustion engine. However, any such obvious variations would clearly be encompassed by the present invention the scope of which is limited only by the appended claims.

Having thus described a preferred embodiment of the instant invention, what is claimed is:

1. In a timing control system having a sensor device that provides a reference pulse at least once during each period of rotation of a rotatable member to indicate that the rotatable member is at a known angular position, a clock source for generating a periodic clockpulse signal, a counter responsive to the clock source for producing a pulse-count signal the value of which is a function of the number of clock-pulses generated, a computing device for receiving a plurality of signals that indicate a corresponding plurality of parameters for computing a count corresponding to a desired angular position of the rotatable member and for generating a signal representative of the desired angle count, and a comparator for receiving the pulse-count signal and the desired angle count signal and for producing a function initiating signal when the pulse-count signal and the desired angle count signal are equal; an improved position extrapolation device comprising:

means in said counter for generating a count signal that is a non-linear function of time and for resetting said counter to a known starting count at each occurrence of said reference pulse, means for sequentially storing the final non-linear count signal to occur immediately prior to each said resetting, and means in said computing device responsive to said storing means and to said parameter indicating signals for computing and generating a signal representing the non-linear count corresponding to a subsequent desired angular position for producing a function signal, whereby a function signal is produced at a desired angular position that is based upon a non-linear extrapolation of a known angular position.

2. The position extrapolation device of claim 1 in which said non-linear count signal generating means comprises means for generating an exponentially decaying count $X(t)$ that, between the occurrence of said references pulses, varies with time $t$ substantially in accordance with $$X(t) = Ke^{-t/\tau}$$

where $K$ is the starting count and
$\tau$ is a constant.

3. The position extrapolation device of claim 2 in which said exponentially decaying count generating means comprises:

means for storing a signal representing said starting count K, means for dividing said stored signal by a signal representing said constant $\tau$ to form a quotient signal, means for subtracting said quotient signal from said stored signal and replacing said stored signal with a substitute stored signal representing the remainder of the subtraction, and means controlling said storing means, said dividing means, and said subtraction means for cyclically dividing said substitute stored signal by the signal representing $\tau$, subtracting the resultant quotient signal from said substitute signal and replacing said substitute stored signal with another substitute signal representing the remainder of the last-mentioned subtraction.

4. An apparatus for predicting the occurrence of a desired angular position of a rotating body, having a sensor for sensing when the body is at a known angular position; the apparatus comprising:

a. means for generating an electrical reference signal in response to said sensor, b. means for generating an electrical count signal that corresponds to a non-linearly decreasing count that is set to a known starting value at an occurrence of said reference signal, c. means for storing the count signal that corresponds to the value of said decreasing count immediately prior to each occurrence of a reference signal, d. means for resetting said count signal generating means to said known starting value upon each subsequent occurrence of a reference signal, e. means for computing the value of said decreasing count corresponding to the time when said rotating body will be at the desired angular position, basing said computation on said stored count signal, and f. means for comparing said computed value and said decreasing count and determining when said decreasing count is equal to said computed value.

5. An improved apparatus for determining the occurrence of a desired angular position of a body rotating at increasing or decreasing angular velocity acting in combination with a sensor used in conjunction with the rotating body for sensing when the body is in a known angular position; the apparatus comprising:

a. means for generating an electrical reference signal in response to said sensor, b. means for generating an electrical count signal that represents a changing count that is set to a known starting value at the occurrence of said reference signal, c. means for storing the count signal that corresponds to the value of said changing count immediately prior to each occurrence of said reference signal, d. means for resetting said count signal generating means to said known starting value upon each subsequent occurrence of said reference signal, e. means for computing extrapolated values of said changing count corresponding to the time when the rotating body will be at the desired angular position, said computation being based upon said previously stored count, f. means for computing the difference between said extrapolated value and said previous count signal, g. means for adding the difference computed by said difference computing means to a currently stored count signal to form a corrected count, and h. means for comparing said corrected count and said changing count and determining when said changing count is equal to said corrected count.

6. An improved method of determining the approximate time of occurrence of a desired angular position of a rotating body wherein a sensor is used in conjunction with the rotating body for sensing the time when the body is at a known angular position; the method comprising the following steps:

a. generating an electrical reference signal in response to said sensor.

b. generating an electrical count signal that corresponds to a non-linearly decreasing count that is set to a known starting value at the occurrence of said reference signal, c. storing the count immediately prior to each occurrence of a reference signal, d. setting said count signal to said known starting value upon each subsequent occurrence of a reference signal, e. computing the value of said decreasing count that corresponds to the time when said rotating body will be at the desired angular position, basing said computation on said stored count signal, and f. comparing said computed value and said decreasing count for determining when said decreasing count is equal to said computed value.

7. An improved method of extrapolating a desired angular position of a rotatable member of an engine with reduction in extrapolation errors due to acceleration, the method comprising the following steps:

a. generating a reference signal each time said rotatable member is at a predetermined angular position, to produce a series of such reference signals, the period of time between each pair of said reference signals being dependent upon the rate of rotation of said rotatable member;

b. generating a series of period signals, each such period signal representing a corresponding period of time between reference pulses;

c. computing said desired angular position upon the basis of an extrapolation from one of said periods prior to the most recent and generating a result signal representing the result of said computation;

d. subtracting from the result signal of step c, the period signal representing the period used in step c, to produce a remainder signal representing the remainder of said subtraction; and e. adding the remainder signal of step d to the period signal representing the most recent one of said periods.

8. An improved method of determining the approximate time of occurrence of the desired angular position of a body rotating at increasing or decreasing angular velocity, wherein a sensor is used in conjunction with the rotating body for sensing the time when the body is at a known angular position; the method comprising the following steps:

a. generating an electrical reference signal in response to said sensor, b. generating an electrical count signal that represents a changing count that is set to a known starting value at the occurrence of said reference signal, c. storing the count signal that corresponds to the value of said changing count immediately prior to each occurrence of a reference signal, d. resetting said count signal to said known starting value upon each subsequent occurrence of a reference signal, e. computing an extrapolated value of said changing count that corresponds to the time when the rotating body will be at the desired angular position, basing said computation upon said previously stored count, f. computing the difference between said extrapolated value and said previously stored count signal, g. adding the difference calculated in step (f) to a currently stored count signal to form a corrected count, and h. comparing said corrected count and said changing count and determining when said changing count becomes equal to said corrected count.

* * * * *